March 15, 1949.  E. P. TURNER  2,464,757
PROPORTIONAL PULSE SIGNALING DEVICE
Filed May 29, 1946  3 Sheets-Sheet 1

Inventor
Edgar P. Turner
By William P. Stewart
Attorney

Witness:
N. Leszczak

March 15, 1949.  E. P. TURNER  2,464,757
PROPORTIONAL PULSE SIGNALING DEVICE
Filed May 29, 1946  3 Sheets-Sheet 2

Witness:
N. Leszczak

Inventor
Edgar P. Turner
By William P. Stewart
Attorney

March 15, 1949.　　　　　E. P. TURNER　　　　　2,464,757
PROPORTIONAL PULSE SIGNALING DEVICE
Filed May 29, 1946　　　　　　　　　　　　3 Sheets-Sheet 3

Inventor
Edgar P. Turner
By William P. Stewart
Attorney

Witness:
Godfrey Pecina

Patented Mar. 15, 1949

2,464,757

UNITED STATES PATENT OFFICE 2,464,757

PROPORTIONAL PULSE SIGNALING DEVICE

Edgar P. Turner, Fanwood, N. J., assignor to The Singer Manufacturing Company, Elizabeth, N. J., a corporation of New Jersey Application May 29, 1946, Serial No. 672,995

7 Claims. (Cl. 177—380)

This invention relates to signaling devices and particularly to those devices which originate a controlled series of electrical pulses of predetermined and controllable time duration in pre-selected channels.

In the field of radio controlled and guided craft of whatever type, it is desirable to control the flight or course of said craft from a remote point in the simplest manner possible. In the case of aircraft, a control stick simulating the manual control stick located on the craft itself requires but little change in operating technique from that already acquired in the ordinary manual control of the aircraft. However, the conventional manual control stick mounted in the aircraft is a proportional displacement device. That is to say, it is mechanically connected to the control surfaces so that movement of said stick results in proportional movement of the control surface. If such a stick were to be merely arranged to generate an electrical signal of magnitude proportional to its displacement, such a signal could not be readily used to modulate a radio signal for transmission and detection at the receiver. That is, a continuous signal of slowly varying magnitude is not well adapted for radio transmission because of the difficulty in distinguishing it from fading or from attenuation of the signal due to increasing range.

A more efficient method of modulating the radio signal proportional to displacement is by the use of periodic pulses of varying time duration, the time duration of each pulse being proportional to the displacement. In this case, the radio frequency signal is, in effect, turned on and off at intervals, with the "on" time being made progressively greater as the displacement of the stick from a neutral position at the transmitter is increased.

It is an object of this invention, therefore, to provide a control stick for remote control of aircraft by radio, the manipulation of which stick will produce or cause to be produced a periodic series of electrical pulses of time duration proportional to the displacement of said stick from a central or neutral position.

To control the course of an aircraft effectively, it is necessary to guide it horizontally to left or right and vertically up or down. It is obvious then, that the control signal must be impressed on the proper pre-selected circuit or channel in order to reach and operate the intended control surface in the aircraft. It may also be desirable to employ two channels simultaneously, as when changing course horizontally and vertically at the same time.

A further object of this invention, therefore, is to provide a radio control stick for producing a series of electrical pulses of proportional time duration in a predetermined circuit or plurality of circuits.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

Figure 1:
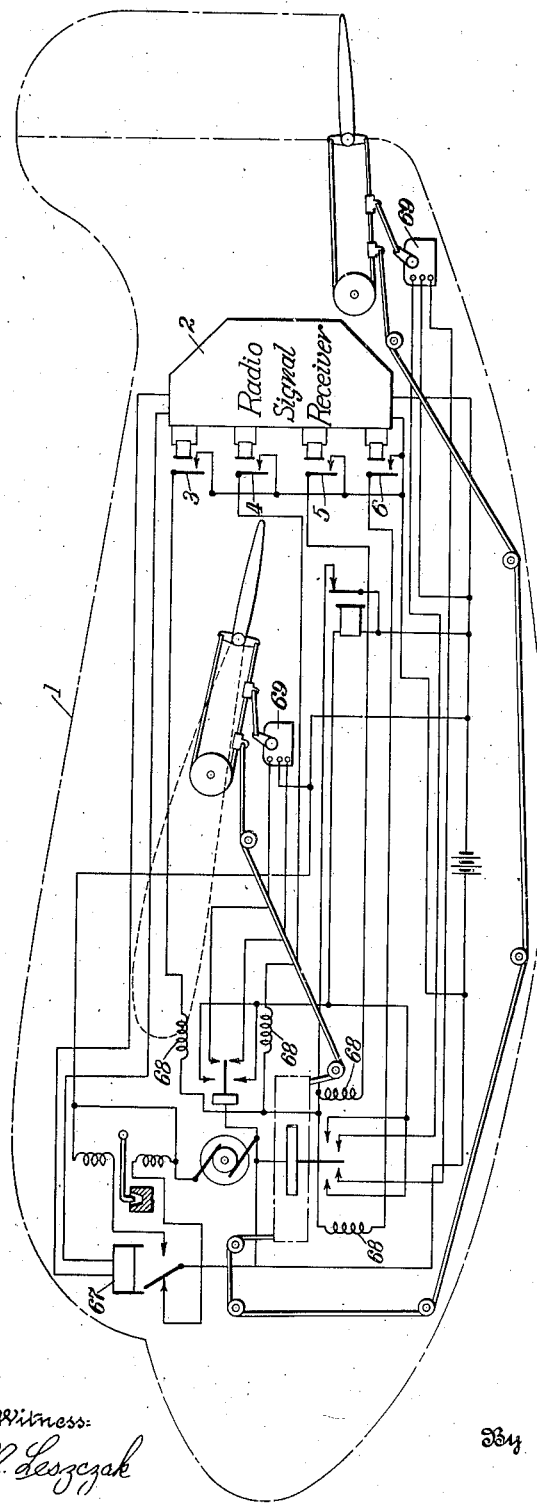
Fig. 1 is a schematic side view of a radio controlled aircraft.

Referring to the drawings, and first to Fig. 1, an aircraft 1 is equipped with a radio signal receiver 2 which controls the operation of relay switches 3, 4, 5 and 6 of an automatic pilot system of the type described in my copending application Serial No. 636,238, filed December 20, 1945, and to which reference may be had for a more complete description thereof.

Figure 2:
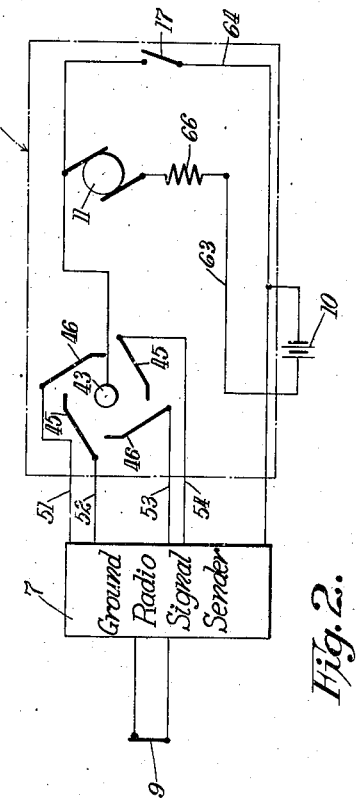
Fig. 2 is a schematic diagram of a radio signal sending station employing a control stick embodying the invention.

A radio signal sender 7, located remote from aircraft 1, is connected to a control stick 8, caging switch 9, and battery 10 as shown schematically in Fig. 2.

Figures 4, 5, 7:
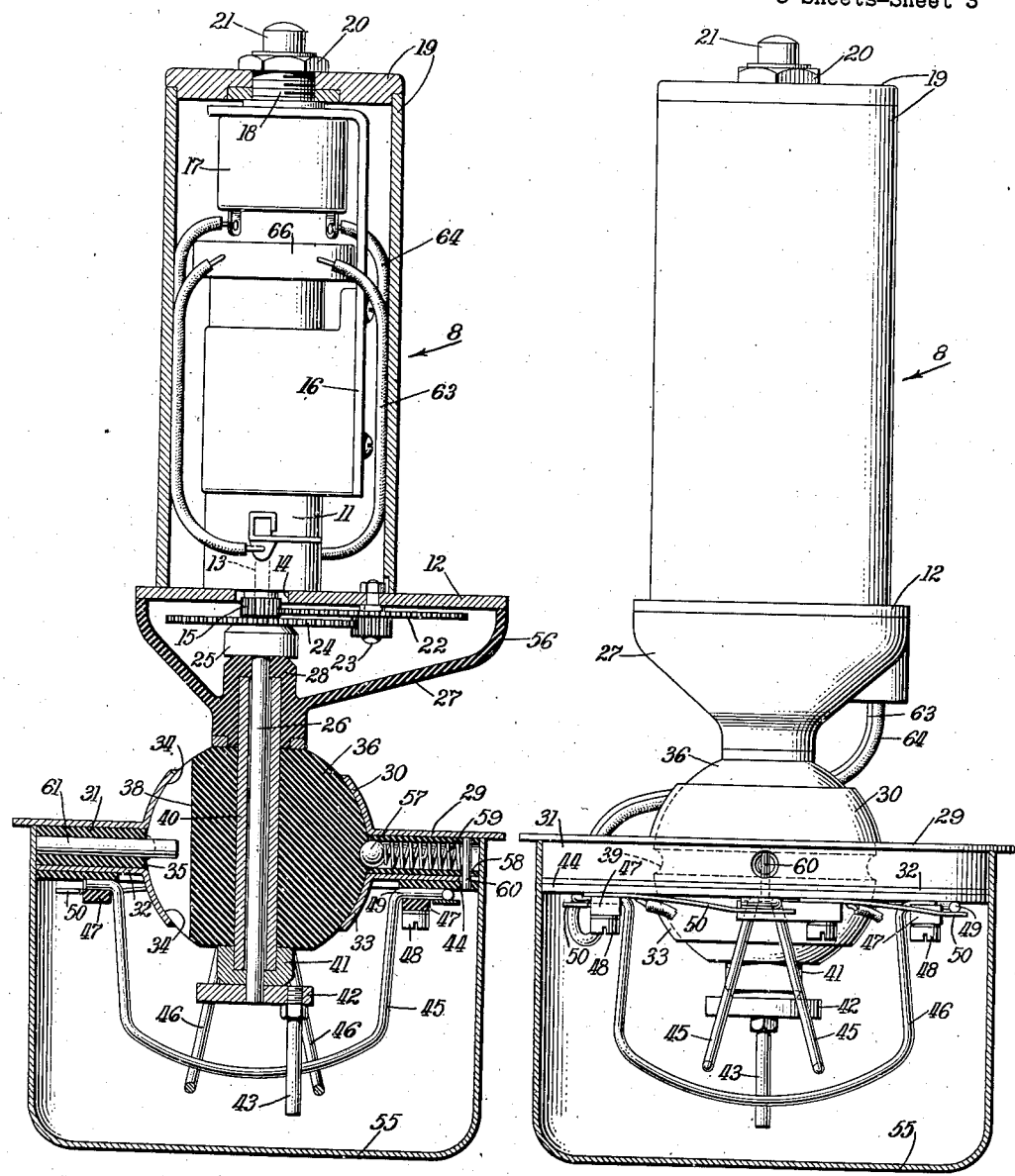
Fig. 4 is an elevational view, partly in section, taken through a control stick embodying the invention.
Fig. 5 is an elevational view, partly in section, of the control stick illustrated in Fig. 4 taken at 90 degrees therefrom.
Fig. 7 is a detailed perspective view of the ball element of the control stick.

As shown clearly in Fig. 4, the control stick preferably comprises broadly a motor-driven rotating contact pin arranged for selective movement toward or away from each of four stationary angularly-spaced contacting springs. More specifically, a small motor 11, preferably one having a permanent magnet field and constant speed characteristics, is supported on a platform 12 with the motor shaft 13 extending vertically downwardly through a platform-aperture 14 and carrying, at its lower extremity, a pinion gear 15. Secured to said motor 11 is an L-shaped bracket 16 which extends upward to provide a support for a switch 17. This switch has a threaded shank portion 18 extending through apertures in said bracket 16 and also in a cup-shaped cover 19, which cover forms a closed casing around said motor 11 and switch 17 and extends downward to the platform 12. A nut 20 threaded onto the shank portion 18 of said switch, externally of said cover 19, holds said cover securely against the platform 12 and thus permits its use as a handle for manipulating the device as will be explained presently. A switch button 21 extends through said shank portion 18 and is positioned for convenient operation by the thumb when the cover is gripped as a handle by the operator.

A step gear 22 mounted for rotation on a stud 23, secured to and depending from the platform 12, is driven by the motor pinion gear 15. Another gear 24, secured to a thrust collar 25 of a shaft 26, is driven by the gear 22. A bell-shaped cover 27, secured to the platform 12, forms therewith a casing for the gears and is provided with a hub portion 28 in which the shaft 26 is journaled. Thus far has been described a vertically-mounted motor and switch enclosed within a container serving as a handle. Next will be described a construction for utilizing the motor output to provide controlled electrical pulses in pre-selected circuits by movement of said handle.

An upper plate 29, formed with a segmentally hemispherical portion 30, is secured to a spacer disc 31 preferably made of molded insulating material and formed with a central aperture 35. A lower plate 32, similarly formed with a segmentally hemispherical portion 33, is secured to said spacer disc in opposed relation to said upper plate and forms therewith a spherical seat 34. Journaled in said spherical seat 34 and free to rotate relative thereto is a ball 36 preferably made of insulating material. Referring to Fig. 7, it is seen that the ball 36 is formed with a central vertical bore 37, an external radial slot 38 parallel with the axis of the bore and a horizontal circumferential groove 39 having its plane normal to the axis of said bore. A torque tube 40, secured to the hub portion 28 of the gear cover 27, is also secured within the central bore of the ball 36, and connects the motor and associated structure rigidly with the ball so that movement of the handle cover 19 produces movement of said ball within its seat 34. The shaft 26 traverses the torque tube 40, is free to rotate relative thereto, and is journaled near its lower end in a bearing block 41 secured to said torque tube. Secured to the lower end of the shaft 26 for rotation therewith is a disc 42 which eccentrically carries a contact pin 43. An insulated plate 44, secured to the lower plate 32, carries the stationary contact assembly about to be described.

Figure 6:
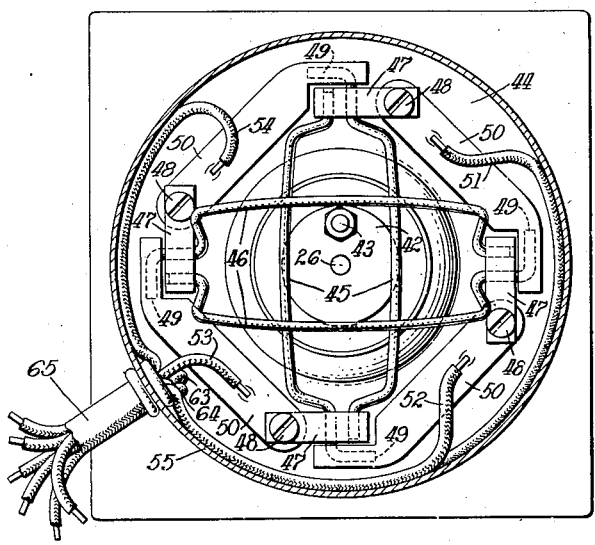
Fig. 6 is a bottom plan view of the control stick with cover removed.

Two pairs of generally U-shaped wire-contacts 45—45 and 46—46 are secured to the insulated plate 44 for pivotal movement relative thereto, by means of insulated slotted cleats 47 secured by screws 48 to said insulated plate, as best seen in Fig. 6. In normal position, the pairs of wire contacts are arranged mutually at right angles and each pair stands so that the plane containing each wire is spaced equally on either side of the axis of the shaft 26 and is inclined slightly outwardly away from parallelism with said shaft axis, as best seen in Figs. 4 and 5. Wires 46 have a greater vertical extent than wires 45 to prevent contact therebetween at the cross-over points, and each wire is electrically insulated from the others. With this arrangement it is seen (Fig. 6) that the wires form a four-sided square array concentric with the axis of the shaft 26. As the shaft rotates, driven by the motor 11, the contact pin 43 describes a cylindrical path entirely within the above noted square and no contact between pin and wires results. This is the neutral position of the handle. As the handle is moved or shifted away from its central or neutral position, however, the axis of the cylinder described by the pin 43 may move toward one of the wires and the pin begins to contact that wire during a portion of each revolution. That is to say, the pin and wire-contact form a switch which is opened and closed periodically in synchronism with the motor speed. Further, the time during which said pin and wire are in contact is made a greater proportion of the total time of each revolution as the handle is displaced further from its neutral position. This is the displacement modulating feature of the stick and is very important to the successful operation of the system as will be explained presently.

To insure that the wires will yield and follow the pin during large displacements of the stick, each wire is terminated in a bent-over portion 49 which is resiliently held against the insulated cover 44 by means of flat spring contacts 50. As the pin 43 pushes against a wire, the bent-over portion thereof is raised against the spring force of the contact 50 which transmits to the wire a biasing force tending to keep pin and wire in contact. These spring contacts 50 also serve to electrically connect the wire contacts 45 and 46 to suitable conductors 51, 52, 53, and 54 for connection to external circuits. A bottom cover 55 is provided to keep foreign matter away from the contacting mechanism and also to serve as a supporting base for the control stick.

It is clear that, if this control element is to effectively direct the course of aircraft in space, some base line must be established as a reference. Accordingly the control stick is designed to be mounted with its base in a horizontal plane and with the substantially vertical plane of wires 45 extending in the fore and aft direction. To make this a simple and easily detectable matter for the operator, the gear cover is formed with an extended portion 56 which should be pointed directly aft. In this position, the control stick simulates the action of the ordinary manual control stick in the aircraft itself.

To establish a neutral horizontal position for the stick, a ball 57 seated within a horizontal cavity 58 in the spacer disc 31 is urged inwardly by spring 59, retained in said cavity by stop pin 60, to engage the peripheral groove 39 of the ball. The ball 57 and groove 39 thus provide a detent device to produce a temporary locked position corresponding to level flight. To maintain the proper fore and aft axis for the stick relative to the contact wires, a horizontal pin 61, secured to spacer disc 31, engages the vertical slot 38 in ball 36 to prevent same from turning horizontally out of said axis. It will be understood that motor and switch leads 63 and 64 are brought through gear cover 27 (Fig. 5) and enter the contact mechanism chamber where they are assembled with the contact leads 51, 52, 53, and 54 to form a single cable 65 which passes through a grommet in lower cover 55 for ultimate connection to radio signal sender 7 and battery 10 as shown in Fig. 2. A resistor 66, located within the upper cover 19, is connected in series with motor and battery for setting the speed of the motor to produce the desired pulse frequency. In the apparatus described herein, the pulse frequency is approximately two per second.

Referring to Fig. 1, a radio controlled aircraft 1 is equipped with a radio signal receiver 2 capable of operating relays 67, 3, 4, 5 and 6 in response to signals originating at the control stick 8 and transmitted by radiant energy to said receiver. These relays open and close circuits which cage and uncage a gyro in response to operation of the switch 9, or control current to a selected one or more of the solenoids 68 in response to operation of the control stick 8, which causes the gyro to precess and close appropriate contacts to operate the proper one of the servo motors 69 which drives a corresponding control surface to control the flight of the aircraft, all as clearly set forth in my copending application hereinbefore referred to. Switch 17 mounted on the stick 8 selectively connects the rotating contact with the radio signal sender as seen best in Fig. 2.

Figure 3:
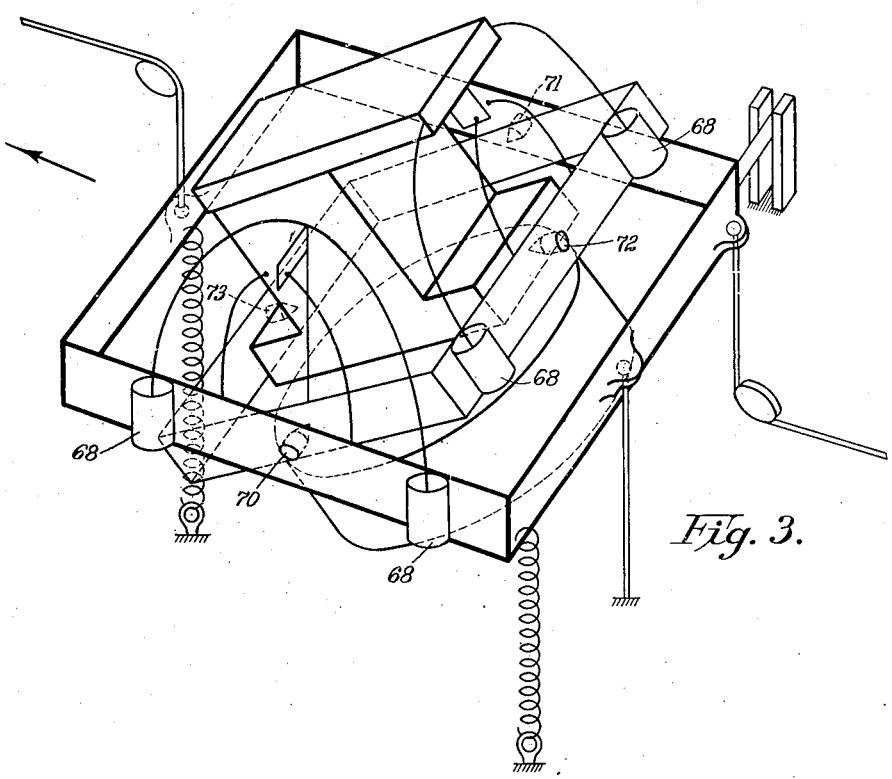
Fig. 3 is a schematic perspective view illustrating the pilot instrument mounted in the aircraft shown in Fig. 1.

Fig. 3 indicates schematically the gyro pilot instrument mounted in the aircraft such that the arrow points in the direction of flight. This direction coincides with the fore and aft direction of the control stick as explained above. Thus, pushing the stick 8 fore or aft will cause the gyro to precess about the axis of trunnions 70 and 71 to close the proper contacts to operate the elevator servo motor to dive or climb the craft as selected. Similarly, motion of the stick to left or right will cause the gyro to precess about the axis of trunnions 72 and 73 to close the proper gyro contacts to operate the aileron servomotor to bank and turn the craft to right or left, as selected.

It is well known that, for a given rotor speed, a gyro will precess at a rate proportional to the torque applied. With relay control, as here employed, the precessing torque applied at each closure is constant. The actual rate of change in course however depends upon the average time rate of torque application, that is, upon the torque integrated over a time period divided by the time period. This is nicely controlled by the device according to the present invention by the pulse modulating feature referred to hereinabove. For example, if a slow maneuver is desired, the stick is pushed but slightly out of neutral position such that the time duration of each pulse is small. Thus the integrated torque divided by the time is small and the maneuver will be accordingly slow. Further movement of the stick away from neutral will cause a pulse of longer duration and therefore produce a greater average torque per unit time and thus cause a faster maneuver. In other words, the control stick behaves precisely as does the regular manual stick mounted on the aircraft.

It may be desirable to control the course of the aircraft horizontally and vertically at the same time, in which case the stick is moved so that the rotating pin 43 contacts two adjacent wires and produces two pulses per revolution, one in each circuit. This provides, in effect, simultaneous control of the aircraft about two axes and is of obvious importance for smooth synchronized maneuvering.

Having thus set forth the nature of the invention, what I claim herein is:

1. A device for originating electrical signals for remote control of aircraft, comprising, a rotatable contact-member having an orbital path of travel about an axis, means for rotating said contact-member, complemental contact-means including regularly spaced elements surrounding said orbital path and normally disposed out of range of said rotatable contact-member, and means providing for relative shifting of the axis of said orbital path and said complemental contact-means for effecting periodic engagement by said rotatable contact-member with said complemental contact-means.

2. A control-stick device for originating electrical signals for remote control of aircraft, comprising, a rotatable contact-member traveling in an orbital path about a shiftable axis, means for rotating said member in said orbital path, relatively stationary contact-members spaced around said orbital path and disposed out of range of said rotatable contact-member when in a neutral position of said axis, and means providing for shifting said axis for periodic engagement by said rotatable contact-member with one or more of said stationary contact-members.

3. A control stick for originating electrical signals for remote control of aircraft, comprising a contact rotatable about a shiftable axis, means for rotating said contact at substantially constant speed, complemental contacts symmetrically positioned relative to and outside of the path of said rotatable contact when in a neutral position of said axis, and means for shifting said axis out of said neutral position toward a selected one or more of said complemental contacts, whereby said rotatable contact makes periodic contact closure with said selected contacts, each contact closure being of time duration proportional to the displacement of said axis from the said neutral position.

4. A control stick for originating electrical signals for remote control of aircraft, comprising a contact rotatable about a shiftable axis, means for rotating said contact at substantially constant speed, complemental contacts symmetrically positioned relative to and out of range of said rotatable contact when in a neutral position of said axis, means for moving said axis relative to said complemental contacts into positions such that said rotatable contact wipes a selected one or more of said stationary contacts, and means for resiliently urging the complemental contacts, so wiped, toward said rotatable contact whereby said rotatable contact makes periodic contact closure with said selected contacts, each contact closure being of time duration proportional to the displacement of said axis from the said neutral position.

5. A control stick for originating electrical signals for remote control of aircraft, comprising a contact rotatable about a shiftable axis, means for rotating said contact at substantially constant speed, complemenal contacts symmetrically positioned relative to and outside of the path of said rotatable contact when in a neutral position of said axis, means for moving said axis out of said neutral position toward a selected one or more of said stationary contacts, whereby said rotatable contact makes periodic contact closure with said selected complemental contacts, and means responsive to pressure of the rotatable contact against the complemental contacts causing yielding of the latter whereby each contact closure is of time duration proportional to the displacement of said axis from the said neutral position.

6. A control stick for originating electrical signals for remote control of aircraft, comprising a single contact rotatable about a shiftable axis, means for rotating said contact at substantially constant speed, mutually insulated stationary wire-contacts arranged to form substantially a square symmetrically positioned relative to and outside of the path of said rotatable contact when in a neutral position of said axis, and manual means for moving said axis out of said neutral position toward a selected one or more of said stationary contacts, whereby said rotatable contact makes periodic contact closure with said selected stationary contacts, each contact closure being of time duration proportional to the displacement of said axis from the said neutral position and the frequency of such closures being proportional to the speed of rotation of said rotatable contact.

7. A control stick for originating electrical signals for remote control of aircraft, comprising a contact rotatable about a shiftable axis to describe a cylindrical path concentric with said axis, means for rotating said contact at substantially constant speed, electrically separated and resilient stationary contacts forming a square array symmetrically positioned relative to and outside of said path of said rotatable contact when in a neutral position of said axis, means for moving said axis out of said neutral position toward a selected one or more of said stationary contacts, so that said path intersects said square array whereby said rotatable contact makes periodic contact closure with each of said selected stationary contacts, each contact closure being of time duration proportional to the displacement of said axis from the said neutral position.

EDGAR P. TURNER.

REFERENCES CITED

The following references are of record in the file of this patent:

UNITED STATES PATENTS

| Number | Name | Date |
| --- | --- | --- |
| 1,794,193 | McKerlie | Feb. 24, 1931 |
| 2,059,152 | Smith | Oct. 27, 1936 |
| 2,067,098 | Rogers | Jan. 5, 1937 |
| 2,397,088 | Clay | Mar. 26, 1946 |